(12) United States Patent
Aoki et al.

(10) Patent No.: US 7,731,789 B2
(45) Date of Patent: Jun. 8, 2010

(54) INK COMPOSITION AND INK JET RECORDING METHOD USING THE SAME

(75) Inventors: Katsuko Aoki, Hiso-Machi (JP); Tsuyoshi Sano, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 374 days.

(21) Appl. No.: 11/731,796

(22) Filed: Mar. 30, 2007

(65) Prior Publication Data

US 2008/0028980 A1    Feb. 7, 2008

(30) Foreign Application Priority Data

Apr. 3, 2006  (JP) .............................. 2006-101699
Nov. 7, 2006  (JP) .............................. 2006-301228

(51) Int. Cl.
*C09D 11/00* (2006.01)
(52) U.S. Cl. ................................. 106/31.75; 106/31.86
(58) Field of Classification Search ............... 106/31.75, 106/31.86
See application file for complete search history.

(56) References Cited

U.S. PATENT DOCUMENTS 6,341,854 B1 *   1/2002   Takemoto .................... 347/96
2002/0007765 A1 *  1/2002   Sano et al. ................ 106/31.49

FOREIGN PATENT DOCUMENTS

| JP | 2000-044858 | 2/2000 |
| JP | 2002-103785 | 4/2002 |
| JP | 2006-272933 | 10/2006 |

OTHER PUBLICATIONS

Patent Abstracts of Japan of JP 2006-272933 dated Oct. 12, 2006.
Patent Abstracts of Japan of JP 2000-044858 dated Feb. 15, 2000.
Patent Abstracts of Japan of JP 2002-103785 dated Apr. 9, 2002.

* cited by examiner

*Primary Examiner*—Jerry Lorengo
*Assistant Examiner*—Veronica Faison Gee
(74) *Attorney, Agent, or Firm*—Ladas and Parry LLP

(57) ABSTRACT

An ink composition containing an aprotic polar solvent, a thermoplastic resin, a pigment, a cyclic amide, a surfactant, and water and is printable on a recording surface that is a plastic film. The ink composition is capable of forming a record, having high weather resistance properties such as adhesion, scratch resistance, and water resistance, on a recording surface that is a plastic film.

17 Claims, No Drawings

INK COMPOSITION AND INK JET RECORDING METHOD USING THE SAME

TECHNICAL FIELD

The present invention relates to ink compositions and particularly relates to an ink composition suitable for recording media having recording surfaces that are plastic films. The present invention also relates to an ink jet recording method using such an ink composition.

BACKGROUND ART

An ink jet recording method is a recording method in which fine droplets of an ink composition are ejected so as to be applied to a recording surface of a recording medium such that printing is performed. This method has an advantage that a high-quality image can be speedily printed at high resolution. A printing technique using the ink jet recording method is employed in general consumer printers used in offices or the like and also employed in industrial printers having a print span of greater than 1 m. Examples of the recording medium include general paper sheets and hydrophobic recording media such as plastic films.

The reason why the ink jet recording method is employed in such industrial printers is that prints can be obtained at low cost even if the number of the prints is small, in addition to the above advantage of the ink jet recording method. In recent years, the ink jet recording method has been widely used to prepare indoor or outdoor trade signs, banners, wall coverings, and room decorations. Recording media and prints used for the indoor or outdoor trade signs or the like need to have high strength depending on their uses. Hence, the recording media include plastic films or base members coated with plastic films and ink containing a colorant, such as a pigment, having weather resistance is applied to the recording media.

In order to subject plastic films which serve as recording media and which have recording surfaces coated with plastic such as polyvinyl chloride to ink jet recording, a solvent-based ink or an ink, such as a UV curable ink or a two-part curable ink, containing a curable monomer has been conventionally used. The solvent-based ink may stink of solvent or may contain a harmful component such as a volatile solvent component. For the UV curable ink and the two-part curable ink, the curable monomer used may contain a harmful component. If a recording medium having a recording surface which is untreated for ink jet recording and which is a plastic film is subjected to ink jet recording using a known aqueous ink, a print obtained has insufficient weather resistance properties such as adhesion, scratch resistance, and water resistance.

For example, the following composition has been proposed (Japanese Unexamined Patent Application Publication No. 2000-44858 (Patent Document 1)): an aqueous pigment ink-jet ink composition, directly applied to hydrophobic recording media, containing a specific graft copolymer. In this technique, ink is prevented from permeating into a recording medium and a binder is fixed on the recording medium. Hence, there is a problem in that the adhesion of the ink to recording medium is less than that of monomer curable inks such as UV curable inks and two-part curable inks.

On the other hand, for example, Japanese Unexamined Patent Application Publication No. 2002-103785 (Patent Document 2) discloses an ink jet recording ink composition in which a lactam or a lactone can be used as a carrier medium substance (for example, Claim 12 in this document). However, in this document, the lactam and the lactone are cited only as examples of a solvent for dissolving a colorant contained in the ink composition and it is not suggested that a recording medium having a recording surface that is a plastic film is subjected to printing.

Therefore, an ink jet recording method using the following ink has been demanded: an aqueous pigment ink for obtaining a plastic record having high durability and weather resistance properties such as adhesion, scratch resistance, and water resistance.

[Patent Document 1] Japanese Unexamined Patent Application Publication No. 2000-44858

[Patent Document 2] Japanese Unexamined Patent Application Publication No. 2002-103785

DISCLOSURE OF THE INVENTION

Problems to be Solved by the Invention

The inventor has investigated aqueous inks, having sufficient weather resistance, for ink jet recording, the aqueous inks being used to subject recording media, having recording surfaces that are plastic films, to ink jet recording. As a result, the inventor has found that the use of an ink composition containing specific components including a specific solvent is effective in improving the quality of a print and the adhesion of the ink composition to a recording medium and also effective in greatly improving the weather resistance of the print. The solvent used is an aprotic polar solvent and is particularly effective in achieving the above improvements when the solvent is compatible or miscible with water and is volatile. The present invention is based on these findings.

Accordingly, it is an object of the present invention to provide an ink composition which is suitable for ink jet recording and which can be printed on a recording medium having a recording surface that is a plastic film. It is another object of the present invention to provide an ink jet recording method using such an ink composition.

Means for Solving the Problems

An ink composition according to the present invention contains an aprotic polar solvent, a thermoplastic resin, a pigment, a cyclic amide, a surfactant, and water.

An ink jet recording method according to the present invention preferably includes ejecting droplets of the ink composition according to the present invention toward a recording surface that is a plastic film, the ink composition being applied to the recording surface such that printing is performed.

BEST MODE FOR CARRYING OUT THE INVENTION

Embodiments of the present invention will now be described.

<Ink Composition>

The ink composition according to the present invention contains the aprotic polar solvent, the thermoplastic resin, the pigment, the cyclic amide, the surfactant, and water as described above.

The ink composition according to the present invention is preferably printed on a recording medium having a recording surface that is a plastic film.

Examples of the recording medium, which has the recording surface that is the plastic film, include plastic films serving as recording media, common recording media including base members which are made of paper or fabric and which are coated with plastic, and plastic films attached to such base members. The plastic used herein is soluble in the aprotic polar solvent or is swollen with the aprotic polar solvent and is not particularly limited. Examples of the plastic include polyvinyl chlorides, polycarbonates, polystyrenes, and polyurethanes. The ink composition according to the present invention can be printed on plastic films that have not yet been subjected to surface treatment for ink jet printing and plastic films that have been subjected to surface treatment for ink jet printing.

The ink composition contains a resin component that is cured into a coating. Therefore, after the ink composition according to the present invention is printed on the recording medium having the recording surface that is the plastic film, the aprotic polar solvent dissolves the recording surface and the evaporation of a volatile component in the ink allows the resin component in the ink composition to be cured into a coating. In this operation, a portion of the resin coating and a portion of the plastic in the dissolved recording surface are formed into a mixture layer. Another portion of the plastic and another portion of the resin coating that are not formed into the mixture layer are tightly bonded to each other with the mixture layer located therebetween. This protects an ink coating from being scratched and prevents water from entering the interface between the ink coating and the recording surface, thereby providing a print having high weather resistance properties such as adhesion, scratch resistance, and water resistance.

In the ink composition according to the present invention, the aprotic polar solvent is diluted with water; hence, wetted members included in printers are prevented from being destroyed or damaged.

Since the ink composition according to the present invention contains the surfactant and therefore has low surface tension, the ink composition does not coagulate on recording media, such as plastic films, absorbing no water and therefore uniformly spreads over the recording media, thereby achieving high recording quality.

<Aprotic Polar Solvent>

The ink composition according to the present invention contains the aprotic polar solvent. Ink jet recording is as follows: fine droplets of the ink composition that is liquid are applied to the recording medium and water in the droplets is then evaporated or allowed to penetrate the recording medium, so that the droplets are dried, whereby recording is performed. The aprotic polar solvent used herein has a vapor pressure less than that of water and therefore vaporizes more slowly than water. The evaporation of water in the ink composition printed on the recording medium increases the concentration of the aprotic polar solvent in a printed portion. The aprotic polar solvent in the ink composition according to the present invention has ability to dissolve plastics; hence, an increase in the concentration of the aprotic polar solvent in the ink applied to the recording medium promotes the dissolution of the plastic for forming the recording surface.

The reasons why the ink composition according to the present invention contains the aprotic polar solvent, which dissolves the plastic, are as follows: (1) the aprotic polar solvent is soluble in water; (2) although the aprotic polar solvent dissolves or swells the plastic at a concentration of 100%, an aqueous solution having an aprotic polar solvent concentration less than or equal to that of the ink composition does not destroy printer components in contact with the ink; (3) a solution having an aprotic polar solvent concentration less than or equal to that of the ink composition does not cause the coagulation of a dispersion component such as a pigment dispersion, a pigment dispersant, or a resin emulsion; and (4) the aprotic polar solvent has a vapor pressure less than or equal to that of water. In the present invention, if a plastic immersed in a solvent is distorted, the plastic is determined to be dissolved or swollen.

Preferred examples of the aprotic polar solvent contained in the ink composition according to the present invention include 1,1,3,3-tetramethylurea, dimethyl sulfoxide, N,N-dimethylformamide, hexamethylphosphoric triamide, and 1,3-dimethyl-2-imidazolidinone. These aprotic polar solvents may be used alone or in combination. The aprotic polar solvent has a limited effect even if the percentage of the aprotic polar solvent in the ink composition is 1% or less. The percentage of the aprotic polar solvent in the ink composition is preferably 1.0 to 50.0 weight percent and more preferably 2.0 to 25.0 weight percent.

<Thermoplastic Resin>

The ink composition according to the present invention contains the thermoplastic resin. The thermoplastic resin has amorphous moieties that are not crystallized or crosslinked. The amorphous moieties have a feature that the amorphous moieties are distorted when the amorphous moieties are melted by heating or dissolved in a specific solvent. When the thermoplastic resin melted or dissolved is solidified, the amorphous moieties are fused to each other, whereby a strong resin layer is formed.

The thermoplastic resin in the ink composition according to the present invention has a glass transition point (Tg) of 40° C. or higher and more preferably 40° C. to 100° C. When the glass transition point (Tg) is low, the thermoplastic resin serves as an adhesive because molecules thereof move actively and therefore are entangled. In contrast, when the glass transition point (Tg) is high, the molecules are separate from each other because the molecules cannot move actively and therefore are hardly entangled. In ink jet recording, ink ejected from a fine nozzle is applied to recording media, whereby recording is performed. In a printing step, if printing is performed by a hot printing process in such a manner that the ink composition is applied to the heated recording media, the ink in the nozzle is dried because a nozzle plate including the nozzle ejecting the ink approaches each heated recording medium and therefore is heated. In the case where a volatile component in the ink is evaporated and therefore solid components such as a pigment and a resin remain in the fine nozzle, the nozzle is blocked if the ink contains a resin having a low glass transition point (Tg); however, the nozzle is hardly blocked if the ink contains a resin having a high glass transition point (Tg).

Since the thermoplastic resin in the ink composition according to the present invention is soluble in a specific aprotic polar solvent, the dissolution and solidification of the thermoplastic resin occur in a process that the ink composition according to the present invention is dried; hence, the thermoplastic resin molecules are fused to each other or the thermoplastic resin and the plastic film are fused to each other, whereby a tough coating of the thermoplastic resin is formed on the plastic film.

The thermoplastic resin used herein may be soluble or insoluble in water. When the resin is soluble in water, a resin dispersant for dispersing pigments is preferably used. When the resin is insoluble in water, particles of the resin are preferably dispersed in the ink composition in the form of a resin emulsion. The resin emulsion has a continuous phase containing water and a disperse phase containing the resin component.

According to a preferred embodiment of the present invention, the thermoplastic resin component is preferably a polymer having a hydrophilic moiety and a hydrophobic moiety.

In the case where the resin emulsion is used, the particle size thereof is not particularly limited as long as the emulsion is maintained. The emulsion preferably has a particle size of about 150 nm or less and more preferably 5 to 100 nm.

The resin may be a resin component similar to a component of a conventional resin emulsion used for ink compositions for ink jet recording. Examples of the resin components include acrylic polymers such as polyacrylates, acrylate copolymers, polymethacrylates, methacrylate copolymers, polyacrylonitriles, acrylonitrile copolymers, polycyanoacrylates, polyacrylamides, polyacrylic acids, and polymethacrylic acids; polyolefins such as polyethylenes, polypropylenes, polybutenes, polyisobutylenes, polystyrenes, and copolymers of these polymers; petroleum resins; coumarone-indene resins; terpene resins; vinyl acetate and vinyl alcohol polymers such as polyvinyl acetates, vinyl acetate copolymers, polyvinyl alcohols, polyvinyl acetals, and polyvinyl ethers; halogen-containing polymers such as polyvinyl chlorides, vinyl chloride copolymers, polyvinylidene chlorides, fluororesins, and fluororubbers; nitrogen-containing vinyl polymers such as polyvinylcarbazoles, polyvinylpyrrolidones, vinyl pyrrolidone copolymers, polyvinylpyridines, and polyvinylimidazoles; diene polymers such as polybutadienes, butadiene copolymers, polychloroprenes, and polyisoprenes (butyl rubbers); polymers produced by ring-opening polymerization; polymers produced by polycondensation; and natural resins.

An emulsion of the resin can be prepared in such a manner that the resin particles and a surfactant, as required, are mixed with water. For example, an emulsion of an acrylic resin or a styrene-acrylic acid copolymer can be prepared in such a manner that a (meth)acrylate resin or a styrene-(meth)acrylate resin is mixed with water and also mixed with an acrylate resin and a surfactant as required. In general, the mixing ratio of the resin component to the surfactant preferably ranges from about 50:1 to 5:1. When the amount of the surfactant is less than the above range, it is difficult to form an emulsion. When the amount of the surfactant is greater than the above range, the durability and/or adhesion of the ink is likely to be insufficient. This is not preferable.

The surfactant used to prepare the resin emulsion is not particularly limited. Preferred examples of the surfactant include anionic surfactants (for example, sodium dodecylbenzene sulfonate, sodium laurate, and ammonium salts of polyoxyethylene alkyl ether sulfates) and nonionic surfactants (for example, polyoxyethylene alkyl ethers, polyoxyethylene alkyl esters, polyoxyethylene sorbitan fatty esters, polyoxyethylene alkylphenyl ethers, polyoxyethylene alkylamines, and polyoxyethylene alkylamides). These surfactants may be used alone or in combination.

The resin emulsion can be prepared in such a manner that a monomer of the resin component is subjected to emulsion polymerization in water in the presence of a polymerization catalyst and an emulsifier. The emulsifier and a polymerization initiator and/or molecular weight modifier used for emulsion polymerization can be used in accordance with an ordinary method.

The polymerization initiator is one similar to those used for ordinary radical polymerization. Examples of the polymerization initiator include potassium persulfate, ammonium persulfate, hydrogen peroxide, azobisisobutyronitrile, benzoyl peroxide, dibutyl peroxide, peracetic acid, cumene hydroperoxide, t-butyl hydroperoxide, and para-menthane hydroxyperoxide. If polymerization is performed in water, the polymerization initiator is preferably soluble in water. Examples of the emulsifier include sodium laurate, ordinary anionic surfactants, nonionic surfactants, amphoteric surfactants, and mixtures of these surfactants. These compounds may be used alone or in combination.

For the ratio of the resin, which is a component in the disperse phase, to water, the amount of water preferably ranges from 60 to 400 weight parts and more preferably 100 to 200 weight parts with respect to 100 weight parts of the resin.

When the resin is used in the form of an emulsion, a known resin emulsion can be used. For example, a resin emulsion disclosed in the following document can be used: Japanese Unexamined Patent Application Publication No. 62-1426, 3-56573, 3-79678, 3-160068, or 4-18462. Alternatively, a commercially available resin emulsion can be also used. Examples of the commercially available resin emulsion include Microgels E-1002 and E-5002 (styrene-acrylic resin emulsions, available from Nippon Paint Co., Ltd.), Voncoat 4001 (acrylic resin emulsion, available from Dainippon Ink and Chemicals, Inc.), Voncoat 5454 (styrene-acrylic resin emulsion, available from Dainippon Ink and Chemicals, Inc.), SAE 1014 (styrene-acrylic resin emulsion, available from Nippon Zeon Co., Ltd.), and Saivinol SK-200 (acrylic resin emulsion, available from Saiden Chemical Industry Co., Ltd.).

In the present invention, the resin may be mixed with other components of the ink composition in the form of a fine powder and is preferably mixed with the ink composition components in the form of an emulsion.

In view of the long-term storage stability and ejection stability of the ink composition, the resin particles preferably have a size of 5 to 400 nm and more preferably 50 to 200 nm.

The content of the resin in the ink composition preferably ranges from 0.1 to 15.0 weight percent and more preferably 0.5 to 10.0 weight percent on a solid basis. When the content of the resin in the ink composition is excessively small, the ink coating formed on the recording medium has a small thickness and therefore may have insufficient adhesion to the recording medium. When the resin content is excessively large, the dispersion of the resin may be unstable during the storage of the ink composition or the evaporation of a slight amount of water may cause the coagulation of the resin; hence, no uniform coating can be formed.

<Pigment>

The ink composition according to the present invention contains the pigment. The pigment may be any conventional one used for aqueous ink compositions for ink jet recording. Examples of the pigment include organic and inorganic pigments. The pigment may be contained in the ink composition in the form of a resin-dispersed pigment prepared by dispersing the pigment with a dispersant such as a water-soluble resin or a surfactant or in the form of a surface-treated pigment which is prepared by introducing a hydrophilic group on the surface of the pigment and which is dispersible or soluble in an aqueous medium in the absence of the dispersant. A resin for dispersing the pigment may be the thermoplastic resin. Two or more types of pigments may be used in combination.

Examples of the inorganic pigments include titanium oxides, iron oxides, and carbon blacks produced by a known process such as a contact process, a furnace process, or a thermal process.

Examples of the organic pigments include azo pigments (for example, azo lakes, insoluble azo pigments, condensed azo pigments, and chelate azo pigments), polycyclic pigments (for example, phthalocyanine pigments, perylene pigments, perinone pigments, anthraquinone pigments, quinacridone pigments, dioxazine pigments, thioindigo pigments, isoindolinone pigments, and quinophthalone pigments), dye chelates (for example, basic dye chelates and acidic dye chelates), nitro pigments, nitroso pigments, and aniline black. One or more of these pigments that have good affinity to water are preferably used.

Examples of the pigment that are suitable for black inks include carbon blacks (C. I. Pigment Black 7) such as furnace blacks, lamp blacks, acetylene blacks, and channel blacks; metals such as copper oxides, iron oxides (C. I. Pigment Black 11), and titanium oxides; and organic pigments such as aniline blacks (C. I. Pigment Black 1).

Preferred examples of the carbon blacks include Carbon Blacks No. 2300, No. 900, MCF 88, No. 20B, No. 33, No. 40, No. 45, No. 52, MA 7, MA 8, MA 100, and No. 2200B available from Mitsubishi Chemical Co., Ltd.; Color Black FW 1, Color Black FW 2, Color Black FW 2V, Color Black FW 18, Color Black FW 200, Color Black S 150, Color Black S 160, Color Black S 170, Printex 35, Printex U, Printex V, Printex 140U, Special Black 6, Special Black 5, Special Black 4A, Special Black 4, and special Black 250 available from Degussa; Conductex SC, Raven 1255, Raven 5750, Raven 5250, Raven 5000, Raven 3500, Raven 1255, and Raven 700 available from Colombia Carbon; and Regal 400R, Regal 330R, Regal 660R, Mogul L, Monarch 700, Monarch 800, Monarch 880, Monarch 900, Monarch 1000, Monarch 1100, Monarch 1300, Monarch 1400, and Elftex 12 available from Cabot.

Examples of the pigment that are suitable for color inks include (C. I. Pigment Yellows 1 (First Yellow G), 3, 12 (Disazo Yellow AAA), 13, 14, 17, 23, 24, 34, 35, 37, 42 (yellow iron oxide), 53, 55, 74, 81, 83 (Disazo Yellow HR), 95, 97, 98, 100, 101, 104, 108, 109, 110, 117, 120, 138, 153, and 154; C. I. Pigment Reds 1, 2, 3, 5, 17, 22 (Brilliant First Scarlet), 23, 31, 38, 48:2 (Permanent Red 2B (Ba)), 48:2 (Permanent Red 2B (Ca)), 48:3 (Permanent Red 2B (Sr)), 48:4 (Permanent Red 2B (Mn)), 49:1, 52:2, 53:1, 57:1 (Brilliant Carmine 6B), 60:1, 63:1, 63:2, 64:1, 81 (Rhodamine 6G Lake), 83, 88, 92, 101 (Iron Red), 104, 105, 106, 108 (Cadmium Red), 112, 114, 122 (Quinacridone Magenta), 123, 146, 149, 166, 168, 170, 172, 177, 178, 179, 185, 190, 193, 209, and 219; and C. I. Pigment Blues 1, 2, 15 (Phthalocyanine Blue R), 15:1, 15:2, 15:3 (Phthalocyanine Blue G), 15:4, 15:6, (Phthalocyanine Blue E), 16, 17:1, 56, 60, and 63.

The particle size of the pigment is not particularly limited. The pigment preferably has an average particle size of 25 μm or less and more preferably 1 μm or less. Since the pigment has an average particle size of 25 μm or less, clogging can be prevented, thereby achieving sufficient ejection stability.

The content of the pigment in the ink composition preferably ranges from 0.5 to 15.0 weight percent and more preferably 1.0 to 10.0 weight percent.

In the case of using the pigment, the pigment is preferably dispersed completely in an aqueous solvent in such a manner that a dispersant is added to ink. The dispersant used herein may be a polymeric dispersant or a surfactant.

Preferred examples of the polymeric dispersant include synthetic polymers, that is, polyvinyl alcohols; polyvinyl pyrrolidones; acrylic resins such as polyacrylic acids, acrylic acid-acrylonitrile copolymers, potassium acrylate-acrylonitrile copolymers, vinyl acetate-acrylate copolymers, and acrylic acid-acrylate copolymers; styrene-acrylic resins such as styrene-acrylic acid copolymers, styrene-methacrylic acid copolymers, styrene-methacrylic acid-acrylate copolymers, styrene-α-methylstyrene-acrylic acid copolymers, and styrene-α-methylstyrene-acrylic acid-acrylate copolymers; styrene-maleic acid copolymers; styrene-maleic anhydride copolymers; vinyl naphthalene-acrylic acid copolymers; vinylnaphthalene-maleic acid copolymers; vinyl acetate copolymers such as vinyl acetate-ethylene copolymers, vinyl acetate-fatty acid vinylethylene copolymers, vinyl acetate-maleate copolymers, vinyl acetate-crotonic acid copolymers, and vinyl acetate-acrylic acid copolymers; and salts of these polymers. Among them, the following copolymers and polymers are particularly preferable: copolymers prepared from monomers having a hydrophobic group and monomers having a hydrophilic group and polymers prepared from monomers each having a hydrophobic group and a hydrophilic group. The copolymers may be random or block copolymers. Examples of the above salts include salts of diethylamine, ammonia, ethylamine, triethylamine, propylamine, isopropylamine, dipropylamine, butylamine, isobutylamine, triethanolamine, diethanolamine, aminomethylpropanol, morpholine, or the like. These compounds for forming the salts may have a neutralization equivalent greater than or equal to that of an organic substance for forming any one of the salts. These copolymers preferably have a weight-average molecular weight of 1000 to 50000 and more preferably 3000 to 10000.

Examples of the surfactant serving as such a dispersant include anionic surfactants, amphoteric surfactants, and nonionic surfactants. Examples of the anionic surfactants include sulfonic acid derivatives such as alkane sulfonates, α-olefin sulfonates, alkylbenzene sulfonates, alkylnaphthalene sulfonic acids, acylmethyltaurine acids, and dialkylsulfosuccinic acids; alkylsulfates; sulfated oils; sulfated olefins; polyoxyethylene alkyl ether sulfates; carboxylates such as fatty acid salts and alkylsarcosincates; and phosphates such as alkylphosphates, polyoxyethylene alkyl ether phosphates, and monoglycerite phosphates. Examples of the amphoteric surfactants include pyridinium salts such as alkylpyridinium salts, amino acid salts such as alkylamino acid salts, and betaines such as alkyldimethyl betaines. Examples of the nonionic surfactants include ethylene oxide adducts such as polyoxyethylene alkyl ethers, polyoxyethylene alkylphenyl ethers, polyoxyethylene alkyl esters, and polyoxyethylene alkylamides; polyol esters such as glycerin alkyl esters, sorbitan alkyl esters, and sugar alkyl esters; polyethers such as polyol alkyl ethers; and alkanolamides such as alkanolamine fatty acid amides. The amount of the dispersant preferably ranges from 1 to 50 weight percent and more preferably 2 to 30 weight percent with respect to that of the pigment.

In a preferred embodiment of the present invention, the dispersant is a salt of a styrene-(meth)acrylic acid copolymer. The styrene-(meth)acrylic acid copolymer salt has a styrene unit and a (meth)acrylate unit in its structure and may have a unit, derived from a monomer, having an unsaturated group other than the (meth)acrylate unit. The styrene-(meth)acrylic acid copolymer salt may be derived from a random copolymer or a block copolymer and can be produced by a known process such as radical polymerization or group transfer polymerization. The styrene-(meth)acrylic acid copolymer salt preferably has an acid value of 50 to 300 and more preferably 70 to 150. The styrene-(meth)acrylic acid copolymer salt preferably has a molecular weight of 1000 to 50000, more preferably 1000 to 15000, and further more preferably 3000 to 10000 on a weight average basis.

The dispersant may be commercially available one. Its examples include Joncryl 68 (a molecular weight of 10000 and an acid value of 195), Joncryl 680 (a molecular weight of 3900 and an acid value of 215), Joncryl 682 (a molecular weight of 1600 and an acid value of 235), Joncryl 550 (a molecular weight of 7500 and an acid value of 200), Joncryl 555 (a molecular weight of 5000 and an acid value of 200), Joncryl 586 (a molecular weight of 3100 and an acid value of 105), Joncryl 683 (a molecular weight of 7300 and an acid value of 150), B-36 (a molecular weight of 6800 and an acid value of 250) available from Johnson Polymer Inc.

The pigment is dispersed with the dispersant in such a manner that the pigment, the dispersant, water, and a water-soluble organic solvent are mixed together with an appropriate dispersing machine such as a ball mill, a sand mill, an attritor, a roll mill, an agitator mill, a Henschel mixer, a colloid mill, an ultrasonic homogenizer, a jet mill, or an angmill.

The surface-treated pigment, which is prepared by introducing a hydrophilic group on the surface of the pigment and which is dispersible or soluble in an aqueous medium in the absence of the dispersant, is rendered dispersible or soluble in water in the absence of the dispersant in such a manner that a hydrophilic group such as a functional group or a salt thereof is introduced on (chemically bonded to) the surface of the pigment directly or indirectly with a polyvalent group. The type and amount of the functional group or salt introduced may be appropriately determined depending on the dispersion stability in an aqueous ink composition, color density, drying properties of ink jet heads, and/or the like.

<Cyclic Amide>

The ink (composition according to the present invention contains the cyclic amide. Ink compositions for ink jet recording contain humectants in consideration of the handiness of the ink compositions during storage or coating. The intended purpose of the humectants is to prevent resin components from coagulating to prevent nozzles of ink jet heads from being clogged, thereby ensuring ejection stability. In the ink composition according to the present invention, the cyclic amide serves as a humectant.

Preferable examples of the cyclic amide, which is contained in the ink composition according to the present invention, include 2-pyrrolidone, N-methyl-2-pyrrolidone, and N-ethyl-2-pyrrolidone. These compounds may be used alone or in combination. The content of the cyclic amide in the ink composition preferably ranges from 0.1 to 40.0 weight percent and more preferably 1.0 to 30.0 weight percent. This is effective in preventing clogging or effective in ensuring ejection stability. An excessive increase in the content thereof may cause drying defects.

<Surfactant>

The ink composition according to the present invention contains the surfactant. Aqueous solutions are usually repelled from the surfaces of hydrophobic materials; however, aqueous solutions containing surfactants can be uniformly applied onto the hydrophobic materials. That is, the ink composition can be uniformly applied onto the hydrophobic materials. The aprotic polar solvent in the ink composition uniformly applied thereonto dissolves a desired surface region. The ink composition can be uniformly applied onto the recording medium; hence, a coating of the resin can be uniformly formed on the recording medium.

A preferred example of the surfactant in the ink composition according to the present invention is a polyether-modified polysiloxane that is represented by Formula (1) below.

[CF1]

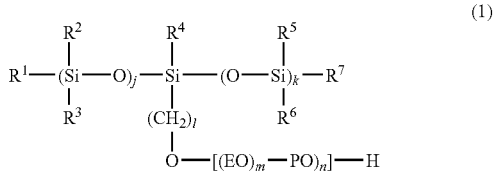

(1)

In Formula (1), $R^1$ to $R^7$ independently represent an alkyl group with one to six carbon atoms, j and k independently represent an integer of one or more, EO represents an ethyleneoxy group, PO represents a propyleneoxy group, m and n represent an integer of zero or more, the sum of m and n is greater than or equal to one, the order of EO and PO inside the brackets is not limited, and EO and PO may be arranged at random or in blocks.

In Formula (1), the alkyl group represented by each of $R^1$ to $R^7$ is preferably a methyl group and j and k are preferably one to five, more preferably one to four, and most preferably one or two. Furthermore, m and n are preferably one to five and the sum of m and n is preferably two to four. According to an ink composition used in a recording process according to a preferred embodiment of the present invention, in the compound represented by Formula (1), j and k are preferably equal to each other and are one to three and more preferably one or two. According to another preferred embodiment, in the compound represented by Formula (1), $R^1$ to $R^7$ all represent a methyl group, j represents one, k represents one, l represents one, m represents an integer of one or more and preferably one to five, and n preferably represents zero. The compound represented by Formula (1) is a commercially available product, which may be used herein. Useful examples of the commercially available product include Silicone Surfactants BYK-347 and BYK-348 available from Byk Chemie Japan K. K.

A preferred example of an acetylene glycol contained therein is a compound represented by Formula (2) below.

[CF2]

$$R^{11}-\underset{\underset{\underset{O}{\overset{|}{\underset{|}{CH_2}}}}{\overset{|}{\underset{|}{CH_2}}}}{\overset{R^{12}}{\overset{|}{\underset{|}{C}}}}-C\equiv C-\underset{\underset{\underset{O}{\overset{|}{\underset{|}{CH_2}}}}{\overset{|}{\underset{|}{CH_2}}}}{\overset{R^{13}}{\overset{|}{\underset{|}{C}}}}-R^{14}$$

(2)

In Formula (2), the sum of m and n is zero to 50 and $R^{11}$, $R^{12}$, $R^{13}$, and $R^{14}$ independently represent an alkyl group.

Preferred examples of the compound represented by Formula (2) include 2,4,7,9-tetramethyl-5-decyne-4,7-diol, 3,6-dimethyl-4-octyne-3,6-diol, and 3,5-dimethyl-1-hexyne-3-ol. The acetylene glycol represented by Formula (2) and derivatives thereof may be commercially available products. Examples of the commercially available products include Surfynols 104, 82, 465, 485, and TG (available from Air Products and Chemicals, Inc.) and Olfines STG and E1010 (products of Nissin Chemical Industry Co., Ltd.).

The polyether-modified polysiloxane and the acetylene glycol may be used alone or in combination. The content of the surfactant, such as the polyether-modified polysiloxane and/or the acetylene glycol, in the ink composition, which is used in an ink jet recording method according to the present invention, may be appropriately determined and preferably ranges from 0.01 to 5.0 weight percent and more preferably 0.1 to 2.0 weight percent.

<Low-Surface Tension Organic Solvent>

The ink composition according to the present invention preferably further contains a low-surface tension organic solvent. The low-surface tension organic solvent, which is contained in the ink composition according to the present invention, is at least one selected from the group consisting of alkane diols and glycol ethers.

Preferred examples of the alkane diols include 1,2-alkane diols with one to six carbon atoms. In view of the dispersion stability of the pigment, the following diols can be cited: 1,2-butane diol, 1,2-pentane diol, and 1,2-hexane diol.

Examples of the glycol ethers include mono($C_1$-$C_8$ alkyl) ethers of diethylene glycol, mono($C_1$-$C_8$ alkyl)ethers of triethylene glycol, mono($C_1$-$C_6$ alkyl)ethers of propylene glycol, mono($C_1$-$C_6$ alkyl)ethers of propylene glycol, and mono ($C_1$-$C_6$ alkyl)ethers of dipropylene glycol. These ethers may be used alone or in combination.

In particular, the following ethers can be cited: ethylene glycol monomethyl ether, ethylene glycol monoethyl ether, ethylene glycol mono-iso-propyl ether, ethylene glycol monobutyl ether, ethylene glycol mono-t-butyl ether, diethylene glycol monomethyl ether, diethylene glycol monoethyl ether, diethylene glycol monopropyl ether, diethylene glycol mono-iso-propyl ether, diethylene glycol monobutyl ether, diethylene glycol mono-t-butyl ether, diethylene glycol monopentyl ether, diethylene glycol monohexyl ether, diethylene glycol monoheptyl ether, diethylene glycol monooctyl ether, triethylene glycol monomethyl ether, triethylene glycol monoethyl ether, triethylene glycol monopropyl ether, triethylene glycol monobutyl ether, triethylene glycol monopentyl ether, triethylene glycol monohexyl ether, triethylene glycol monoheptyl ether, triethylene glycol monooctyl ether, propylene glycol monomethyl ether, propylene glycol monoethyl ether, propylene glycol monopropyl ether, propylene glycol mono-iso-propyl ether, propylene glycol monobutyl ether, propylene glycol mono-t-butyl ether, propylene glycol monopentyl ether, propylene glycol monohexyl ether, dipropylene glycol monomethyl ether, dipropylene glycol monoethyl ether, propylene glycol monopropyl ether, dipropylene glycol mono-iso-propyl ether, dipropylene glycol monobutyl ether, dipropylene glycol monopentyl ether, dipropylene glycol monohexyl ether, and the like.

The alkane diols and the glycol ethers can impart the following auxiliary functions to the ink composition: a humectant function and a surfactant function of uniformly applying the ink composition onto a print. The content of one or more of the alkane diols and the glycol ethers in the ink composition may be appropriately determined and preferably ranges from 1 to 20 weight percent and more preferably 3 to 15 weight percent.

<Other Components>

In order to uniformly apply the water-soluble organic solvent containing the aprotic polar solvent onto the recording medium, the water-soluble organic solvent is diluted with a solvent and then applied thereonto. Examples of such a principal solvent include water and water-soluble organic solvents. In the present invention, the principal solvent is preferably water in view of safety. In order to minimize the amount of ionic impurities, the following water can be used herein: ultra-pure water or pure water such as ion exchange water, ultrafiltered water, reverse osmosis water, or distilled water. Water sterilized by ultraviolet irradiation, hydrogen peroxide addition, or another technique is preferably used because the growth of molds or bacteria can be prevented during the long-term storage of the aqueous ink composition.

Since the ink composition according to the present invention contains the above components, desired advantages can be achieved. The ink composition may further contain an antiseptic/fungicidal agent, a pH adjuster, a dissolution aid, an oxidation inhibitor, and/or an agent for preventing nozzles from being clogged.

Examples of the pH adjuster include potassium dihydrogen phosphate and disodium hydrogen phosphate. Examples of the antiseptic/fungicidal agent include sodium benzoate, sodium pentachlorophenolate, sodium 2-pyridinethiol-1-oxide, sodium sorbate, sodium dehydroacetate, and 1,2-dibenzothiazoline-3-on (Proxel CRL, Proxel BDN, Proxel GXL, Proxel XL-2, Proxel TN available from ICI). Examples of the dissolution aid or the oxidation inhibitor include amines such as diethanol amine, triethanol amine, propanol amine, and morpholine; modifications of the amines; inorganic salts such as potassium hydroxide, sodium hydroxide, and lithium hydroxide; ammonium hydroxide; quaternary ammonium hydroxides (tetramethyl ammonium and the like); carbonates such as potassium carbonate, sodium carbonate, and lithium carbonate; phosphates; ureas such as urea and thiourea; allophanates such as allophanate and methyl allophanate; biurets such as biuret and dimethylbiuret; L-ascorbic acid; and salts of L-ascorbic acid. In order to prevent nozzles from being dried, the ink composition may further contain urea, thiourea, or ethylene urea.

Properties of the ink composition according to the present invention can be appropriately adjusted. The ink composition preferably has a viscosity of 25 mPa·s or less and more preferably 10 mPa·s or less (25° C.). When the viscosity thereof is inside this range, the ink composition can be stably ejected from an ink ejection head. The surface tension of ink composition according to the present invention can be appropriately adjusted. The ink composition preferably has a surface tension of about 20 to 40 mN/m (25° C.) and more preferably about 23 to 33 mN/m.

<Production of Ink Composition>

The ink composition according to the present invention can be prepared in such a manner that the above components are mixed in an arbitrary order separately or in the form of a pigment dispersion or a resin emulsion and then dissolved (or dispersed) and impurities and the like are removed from the mixture by filtration as required.

The content of each component in the ink composition according to the present invention can be appropriately determined in consideration of that the amount of the aprotic polar solvent is sufficient to dissolve the plastic of the recording surface, that the ink composition has a viscosity and surface tension sufficient to be ejected from an ink jet recording head, that the ink composition does not coagulate or solidify in a storage reservoir or a nozzle of an ink jet head, and that wetted members of ink jet printers are prevented from being dissolved or destroyed. The typical composition of the ink composition is as follows:

Pigment: 0.5 to 15.0 weight percent

Resin: 0.01 to 10.0 weight percent (a solid basis)

Aprotic polar solvent: 1.0 to 50.0 weight percent

Cyclic amide: 0.1 to 40.0 weight percent

Surfactant: 0.01 to 5.0 weight percent

Low-surface tension organic solvent: 1.0 to 20.0 weight percent

Water: rest.

<Recording Method>

The ink jet recording method according to the present invention is that printing is performed in such a manner that the ink composition droplets are ejected toward the recording surface so as to be applied to the recording surface as described above.

The amount of the ink composition applied to the recording surface may be appropriately varied depending on the type of the recording medium and/or the reproducibility of an image.

According to a preferred embodiment of the present invention, an ink jet recording method includes one or both of a hot printing step of applying the ink composition to the heated recording medium and a heating step of heating the recording medium having the ink composition applied thereto.

According to another preferred embodiment of the present invention, an ink jet recording method includes one or both of the hot printing step of applying the ink composition to the heated recording medium and the heating step of heating the recording medium having the ink composition applied thereto. The ink composition used for recording contains the thermoplastic resin and the thermoplastic resin has a glass transition point (Tg) is higher than or equal to the temperature of the hot printing step.

According to another preferred embodiment of the present invention, an ink jet recording method includes both of a hot printing step of applying the ink composition to the heated recording medium and a heating step of heating the recording medium having the ink composition applied thereto. The temperature of the heating step of heating the recording medium having the ink composition applied thereto is higher than or equal to the temperature of the hot printing step of applying the ink composition to the heated recording medium, the ink composition used for recording contains the thermoplastic resin, and the thermoplastic resin has a glass transition point (Tg) is higher than or equal to the temperature of the hot printing step.

Since the recording medium, to which the ink composition is to be applied, is heated, the plastic film on the recording surface is readily dissolved in the ink composition applied thereto. Since the recording medium is further heated after the ink composition is applied to the recording medium, the dissolution of the plastic film is promoted and volatile components contained in the ink composition are evaporated. Since the resin in the ink composition is thermoplastic, the adhesion between the recording surface and the resin coating is high.

In the ink jet recording method including both of the hot printing step of applying the ink composition to the heated recording medium and the heating step of heating the recording medium having the ink composition applied thereto, since the temperature of the heating step of heating the recording medium having the ink composition applied thereto is higher that or equal to the temperature of the hot printing step of applying the ink composition to the heated recording medium, nozzles are hardly clogged with ink. Furthermore, since the temperature of the heating step of heating the recording medium having the ink composition applied thereto is high, the thermoplastic resin having a high glass transition point (Tg) can be used. This enhances the rub-off resistance and scratch resistance of records and reduces the heating time thereof.

Heating can be performed by an ordinary process using a commonly used heater, that is, a known heating unit such as an infrared heating unit or a hot-air heating unit. According to the present invention, heating conditions are not particularly limited and may be determined depending on the type and content of a solvent used and the type of resin particles such that the recording surface can be dissolved and the resin coating can be formed by curing the resin contained in the ink composition. In the case of heating by a heater or drying by hot air, exemplary heating conditions are as follows: a heating temperature of 25° C. to 90° C. (preferably 40° C. to 70° C.) and a heating time of one minute to one day (preferably two minutes to eight hours) including a printing time.

EXAMPLES

The present invention will now be further described in detail with reference to examples. The present invention is not limited to the examples.

<Preparation of Ink Composition>

Ink compositions were prepared so as to have compositions shown in Table 1, 2, 3, or 4. The compositions are shown in weight percent.

TABLE 1

| Name | Example 1 | | | | Example 2 | | | |
| --- | --- | --- | --- | --- | --- | --- | --- | --- |
| | Bk1 | Y1 | M1 | C1 | Bk2 | Y2 | M2 | C2 |
| Pigment: carbon black | 4 | | | | 4.5 | | | |
| Pigment: C.I Pigment Yellow 74 | | 3 | | | | 3.5 | | |
| Pigment: C.I Pigment Violet 19 | | | 3 | | | | 3.2 | |
| Pigment: C.I Pigment Blue 15:3 | | | | 3 | | | | 3 |
| Styrene-acrylic acid copolymer (in solid terms, Tg 55° C.) | 2 | 1.5 | 1.5 | 1.5 | 2 | 1.5 | 1.5 | 1.5 |
| 1,1,3-tetramethylurea | 15 | 15 | 15 | 15 | | | | |
| Dimethyl sulfoxide | | | | | 10 | 10 | 10 | 10 |
| Surfactant: Surfynol 465 | 2 | 2 | 2 | 2 | 2.2 | 2 | 2 | 2 |
| 1,2-hexanediol | 3 | 3 | 3 | 3 | 5 | 6 | 6 | 6.5 |

TABLE 1-continued

|  | Example 1 | | | | Example 2 | | | |
| --- | --- | --- | --- | --- | --- | --- | --- | --- |
| Name | Bk1 | Y1 | M1 | C1 | Bk2 | Y2 | M2 | C2 |
| N-methyl-2-pyrrolidone | 5 | 5 | 5 | 5 | 4 | 4 | 4 | 4 |
| Pure water | 69 | 70.5 | 70.5 | 70.5 | 72.3 | 73 | 73.3 | 73 |

TABLE 2

|  | Example 3 | | | | Example 4 | | | |
| --- | --- | --- | --- | --- | --- | --- | --- | --- |
| Name | Bk3 | Y3 | M3 | C3 | Bk4 | Y4 | M4 | C4 |
| Pigment: carbon black | 4 | | | | 4 | | | |
| Pigment: C.I Pigment Yellow 74 | | 3 | | | | 3 | | |
| Pigment: C.I Pigment Violet 19 | | | 3 | | | | 3 | |
| Pigment: C.I Pigment Blue 15:3 | | | | 3 | | | | 3 |
| Styrene-acrylic acid copolymer (in solid terms, Tg 65° C.) | 1.8 | 1.2 | 1.2 | 1.2 | 2 | 1.5 | 1.5 | 1.5 |
| hexamethylphosphoric triamide | 15 | 15 | 15 | 15 | | | | |
| 1,3-dimethyl-2-imidazolidinone | | | | | 12 | 14 | 14 | 14 |
| Surfactant: Surfynol 465 | 1.5 | 2 | 2 | 1.8 | 2.2 | 2 | 2 | 2 |
| 1,2-hexanediol | 3 | 4 | 4 | 4 | 5 | 5 | 5 | 5 |
| N-methyl-2-pyrrolidone | 5 | 5 | 5 | 5 | 3 | 3 | 3 | 3 |
| Pure water | 69.7 | 69.8 | 69.8 | 70 | 71.8 | 71.5 | 71.5 | 71.5 |

TABLE 3

|  | Example 5 | | | | Comparative Example 1 | | | |
| --- | --- | --- | --- | --- | --- | --- | --- | --- |
| Name | Bk5 | Y5 | M5 | C5 | Comparative Bk1 | Comparative Y1 | Comparative M1 | Comparative C1 |
| Pigment: carbon black | 4.5 | | | | 4 | | | |
| Pigment: C.I Pigment Yellow 74 | | 3.5 | | | | 3 | | |
| Pigment: C.I Pigment Violet 19 | | | 3.2 | | | | 3 | |
| Pigment: C.I Pigment Blue 15:3 | | | | 3 | | | | 3 |
| N,N-dimethylformamide | 10 | 10 | 10 | 10 | | | | |
| Styrene-acrylic acid copolymer (in solid terms, Tg 55° C.) | 2 | 1.5 | 1.5 | 1.5 | 2 | 1.5 | 1.5 | 1.5 |
| Surfactant: Surfynol 465 | 2.2 | 2 | 2 | 2 | 1.5 | 2 | 2 | 1.8 |
| 1,2-hexanediol | 5 | 6 | 6 | 6.5 | 5 | 5 | 5 | 5 |
| N-methyl-2-pyrrolidone | 4 | 4 | 4 | 4 | 7 | 5 | 5 | 5 |
| Pure water | 72.3 | 73 | 73.3 | 73 | 80.5 | 83.5 | 83.5 | 83.7 |

TABLE 4

|  | Comparative Example 2 | | | |
| --- | --- | --- | --- | --- |
| Name | Comparative Bk2 | Comparative Y2 | Comparative M2 | Comparative C2 |
| Pigment: carbon black | 4 | | | |
| Pigment: C.I Pigment Yellow 74 | | 3 | | |
| Pigment: C.I Pigment Violet 19 | | | 3 | |
| Pigment: C.I Pigment Blue 15:3 | | | | 3 |
| Styrene-acrylic acid copolymer (in solid terms, Tg 20° C.) | 2 | 1.5 | 1.5 | 1.5 |
| 1,1,3,3-tetramethylurea | 15 | 15 | 15 | 15 |
| Surfactant: Surfynol 465 | 2 | 2 | 2 | 2 |
| 1,2-hexanediol | 3 | 3 | 3 | 3 |
| N-methyl-2-pyrrolidone | 5 | 5 | 5 | 5 |
| Pure water | 69 | 70.5 | 70.5 | 70.5 |

<Evaluation Test>

(Preparation of Print Samples>

Print samples were prepared using the ink compositions prepared in the examples and comparative examples described above. In particular, a 100% duty pattern and a portrait (SCID according to JIS X 9201-1995, Japan Standards Association) were printed on three types of recording media described below using Ink Jet Printer "PX-G920" (available from Seiko Epson Corporation) modified so as to be heated during printing.

Heating: The recording media were heated to 50° C. in advance of printing, subjected to printing, and then further heated at 60° C. for one hour in an atmosphere with a relative humidity of 20%.

Recording media: <1> Ink jet recording medium LLSP2000 (coated with polyvinyl chloride, available from Sakurai Co., Ltd.) and <2> Polyvinyl chloride film "Scotchcal Film" (Sumitomo 3M Limited) untreated for ink jet recording.

(Evaluation of Samples)

Evaluation 1: Adhesion

An adhesive tape (Sellotape® No. 252 available from Sekisui Chemical Co., Ltd.) was attached to a printed portion of each print sample, rubbed with a finger two or three times, and then removed therefrom. The state of the resulting printed portion was visually observed. Obtained results were evaluated according to standards below.

A: Ink (colorant) is not removed from a recording medium at all.

B: Ink (colorant) is partly removed from a recording medium.

C: Ink (colorant) is seriously removed from a recording medium.

Evaluation 2: Rub-Off/Scratch Resistance

The printed portions were scratched with pencils having different hardnesses using a 750-g load pencil scratch tester according to JIS K-5600-5-4 and then checked whether the printed portions were scratched off. Obtained results were evaluated according to standards below.

A: A printed portion is not scratched off with an H pencil.

B: A printed portion is scratched off with an H pencil but is not scratched off with an HB pencil.

C: A printed portion is scratched off with an HB pencil.

Evaluation 3: Water Resistance

A droplet of running water was applied to the printed portion of each print sample, allowed to stand for one minute, and then removed therefrom with a cotton sheet. The state of the resulting printed portion and that of the cotton sheet were visually observed. Obtained results were evaluated according to standards below.

A: Ink (colorant) is not removed from a recording medium at all or no cotton sheet is colored.

C: Ink (colorant) is partly removed from a recording medium and a cotton sheet is colored.

Evaluation 4: Clogging Resistance During Printing

The recording media were heated at 50° C. and solid and line patterns were continuously printed on A4 sheets of PPC paper. The following number was counted: the number of times nozzles were cleaned to perform normal printing in the case of ink dot missing or curved flight while 100 of the paper sheets were being subjected to printing.

A: The number of cleaning times is two or less.

C: The number of cleaning times is three or more.

The results are as shown in Tables 5 and 6.

TABLE 5

| Ink sets | Media | 1. Adhesion | 2. Rub-off/ scratch resistance | 3. Water resistance |
| --- | --- | --- | --- | --- |
| Example 1 | <1> | A | A | A |
|  | <2> | A | A | A |
| Example 2 | <1> | A | A | A |
|  | <2> | A | A | A |
| Example 3 | <1> | A | A | A |
|  | <2> | A | A | A |
| Example 4 | <1> | A | A | A |
|  | <2> | A | A | A |
| Example 5 | <1> | A | A | A |
|  | <2> | A | A | A |
| Comparative Example 1 | <1> | B | B | A |
|  | <2> | C | C | C |

TABLE 6

| Ink sets | 4. Clogging resistance |
| --- | --- |
| Example 1 | A |
| Comparative Example 2 | C |

The invention claimed is:

1. An ink composition containing an aprotic polar solvent, a thermoplastic resin, a pigment, a cyclic amide, a surfactant, and water, wherein the aprotic polar solvent is at least one selected from the group consisting of 1,1,3,3-tetramethylurea, dimethyl sulfoxide, N,N-dimethylformamide, hexamethylphosphoric triamide, and 1,3-dimethyl-2-imidazolidinone, wherein the thermoplastic resin has a glass transition point (Tg) of 40° C. or higher, and wherein the aprotic polar solvent is present in the ink composition in an amount of from 10-15 weight percent.

2. The ink composition according to claim 1, wherein the cyclic amide is at least one selected from the group consisting of 2-pyrrolidone, N-methyl-2-pyrrolidone, and N-ethyl-2-pyrrolidone.

3. The ink composition according to claim 1, wherein the surfactant is at least one selected from the group consisting of polyether-modified polysiloxanes and acetylene glycols.

4. The ink composition according to claim 1, further containing a low-surface tension organic solvent.

5. The ink composition according to claim 4, wherein the low-surface tension organic solvent is at least one selected from the group consisting of alkane diols and glycol ethers.

6. An ink jet recording method comprising ejecting droplets of the ink composition according to claim 1 toward a recording surface, the ink composition being applied to the recording surface such that printing is performed.

7. The ink jet recording method according to claim 6, wherein recording surface is a plastic film.

8. The ink jet recording method according to claim 6, further comprising one or both of a hot printing step of applying the ink composition to the heated recording medium and a heating step of heating the recording medium having the ink composition applied thereto.

9. The ink jet recording method according to claim 8, comprising one or both of the hot printing step of applying the ink composition to the heated recording medium and the heating step of heating the recording medium having the ink composition applied thereto, wherein the temperature to heat the recording medium is lower than or equal to the glass transition point (Tg) of the thermoplastic resin contained in the ink composition.

10. An ink jet recording method comprising a hot printing step of applying an ink composition to a heated recording medium and a heating step of heating the recording medium having the ink composition applied thereto, wherein the temperature of the heating step of heating the recording medium having the ink composition applied thereto is higher than or equal to the temperature of the hot printing step of applying the ink composition to the heated recording medium and is lower than or equal to the glass transition point (Tg) of the thermoplastic resin contained in the ink composition according to claim 1.

11. An ink composition containing an aprotic polar solvent, a thermoplastic resin, a pigment, a cyclic amide, a surfactant, and water, wherein the aprotic polar solvent is at least one selected from the group consisting of 1,1,3,3-tetramethylurea, dimethyl sulfoxide, N,N-dimethylformamide, hexamethylphosphoric triamide, and 1,3-dimethyl-2-imidazolidinone, wherein the thermoplastic resin has a glass transition point (Tg) of 40° C. or higher, and wherein the aprotic polar solvent is present in the ink composition in an amount between 2.0 to 25.0 weight percent effective for improving adhesion, scratch resistance or water resistance of print formed with the ink composition on a recording medium that comprises a plastic film.

12. The ink composition according to claim 11, wherein the cyclic amide is at least one selected from the group consisting of 2-pyrrolidone, N-methyl-2-pyrrolidone, and N-ethyl-2-pyrrolidone.

13. The ink composition according to claim 11, wherein the surfactant is at least one selected from the group consisting of polyether-modified polysiloxanes and acetylene glycols.

14. The ink composition according to claim 11, further containing a low-surface tension organic solvent.

15. The ink composition according to claim 11, wherein the low-surface tension organic solvent is at least one selected from the group consisting of alkane diols and glycol ethers.

16. An ink jet recording method comprising ejecting droplets of the ink composition according to claim 11 toward a recording surface, the ink composition being applied to the recording surface such that printing is performed.

17. An ink jet recording method comprising a hot printing step of applying the ink composition of claim 11 to a heated recording medium and a heating step of heating the recording medium having the ink composition applied thereto, wherein the temperature of the heating step of heating the recording medium having the ink composition applied thereto is higher than or equal to the temperature of the hot printing step of applying the ink composition to the heated recording medium and is lower than or equal to the glass transition point (Tg) of the thermoplastic resin contained in the ink composition.

* * * * *